(12) United States Patent
Nasvik et al.

(10) Patent No.: US 9,709,768 B2
(45) Date of Patent: Jul. 18, 2017

(54) OPTICAL CONNECTOR

(71) Applicant: STATOIL PETROLEUM AS, Stavanger (NO)

(72) Inventors: Håvard Nasvik, Stavanger (NO); Kjetil Johannessen, Ranheim (NO)

(73) Assignee: STATOIL PETROLEUM AS, Stavanger (NO)

( * ) Notice: Subject to any disclaimer, the term of this patent is extended or adjusted under 35 U.S.C. 154(b) by 0 days.

(21) Appl. No.: 15/106,156

(22) PCT Filed: Dec. 16, 2014

(86) PCT No.: PCT/EP2014/078075
§ 371 (c)(1),
(2) Date: Jun. 17, 2016

(87) PCT Pub. No.: WO2015/091559
PCT Pub. Date: Jun. 25, 2015

(65) Prior Publication Data
US 2016/0306131 A1 Oct. 20, 2016

(30) Foreign Application Priority Data
Dec. 17, 2013 (GB) .................................. 1322322.7

(51) Int. Cl.
| | |
|---|---|
| *G02B 6/50* | (2006.01) |
| *G02B 6/38* | (2006.01) |
| *G02B 6/293* | (2006.01) |
| *G02B 6/36* | (2006.01) |
| *G02B 6/26* | (2006.01) |
| *E21B 1/02* | (2006.01) |
| *E21B 1/12* | (2006.01) |
| *E21B 47/12* | (2012.01) |

(Continued)

(52) U.S. Cl.
CPC ............ *G02B 6/502* (2013.01); *E21B 17/028* (2013.01); *E21B 47/123* (2013.01); *G02B 6/262* (2013.01); *G02B 6/29331* (2013.01); *G02B 6/3656* (2013.01); *G02B 6/3806* (2013.01); *G02B 6/2821* (2013.01); *G02B 6/3604* (2013.01)

(58) Field of Classification Search
CPC .. G02B 6/502; G02B 6/29331; G02B 6/3656; G02B 6/3806; G02B 6/262; G02B 6/3604; G02B 6/2821; E21B 47/123; E21B 17/028
See application file for complete search history.

(56) References Cited

U.S. PATENT DOCUMENTS

| | | | |
|---|---|---|---|
| 4,753,497 A | 6/1988 | Fujii et al. | |
| 6,658,176 B2 * | 12/2003 | Amantea ............ | G02B 6/12002 385/14 |

(Continued)

FOREIGN PATENT DOCUMENTS

WO    WO 00/57020 A1    9/2000

*Primary Examiner* — Ryan Lepisto
(74) *Attorney, Agent, or Firm* — Birch, Stewart, Kolasch & Birch, LLP

(57) ABSTRACT

A pipe section for coupling to one or more pipe sections in order to form an elongate tubular. The pipe section has an optical fiber extending along a longitudinal axis of the pipe section and a waveguide disposed near one end of the pipe section and is in optical communication with the optical fiber to guide light in a plane substantially perpendicular to the longitudinal axis.

18 Claims, 2 Drawing Sheets

(51) Int. Cl.
*E21B 17/02* (2006.01)
*G02B 6/28* (2006.01)

(56) References Cited

U.S. PATENT DOCUMENTS

| | | | |
|---|---|---|---|
| 7,885,499 B2 * | 2/2011 | Blauvelt | G02B 6/12002 |
| | | | 385/30 |
| 2002/0075114 A1 | 6/2002 | Hall et al. | |
| 2005/0207279 A1 | 9/2005 | Chemali et al. | |
| 2007/0167051 A1 | 7/2007 | Reynolds, Jr. | |
| 2011/0044697 A1 * | 2/2011 | Peter | H04B 10/801 |
| | | | 398/140 |

\* cited by examiner

OPTICAL CONNECTOR

TECHNICAL FIELD

The invention relates to the field of optical communication in oil production and oil drilling.

BACKGROUND

During oil drilling and production, signals may be sent along a pipe for communication with down-hole devices such as detectors. Such signals can be sent along a communication channel which follows the path provided by the pipe. There are also other applications than oil drilling and production in which signals are sent along the path provided by a pipe. An electrical signal can be sent along an electrical cable. Wired pipe technology exists for a drill pipe in which an electrical cable is provided inside the pipe and inductive couplers are provided at the pin and box ends of the pipe. The inductive coupling provides an electrical connection from one pipe section to a second pipe section when the two pipe sections are connected together. This connection is an electrical pathway for signals travelling both ways through the pipe string. The transmission rate is in practice typically limited to 56 Kbits/second. The limited data transmission rate prevents real time communication of detailed data generated down hole to the surface. Those data can only be retrieved later when the drill string or other pipe is pulled back to surface.

SUMMARY

According to a first aspect of the invention, there is provided a pipe section for coupling to one or more further pipe sections in order to form an elongate tubular, the pipe section comprising an optical fibre extending along the longitudinal direction of the pipe section, a waveguide disposed near one end of the pipe section and being in optical communication with the optical fibre, the waveguide being configured to guide light in a plane substantially perpendicular to the longitudinal axis of the pipe section.

The waveguide may, at least partially, be curved and may have a radius of curvature substantially the same as the radius of curvature of the wall of the pipe section. The waveguide may have at least one mode which partially extends outside the waveguide and the mode may extend into a region outside the pipe section.

The waveguide may be configured to guide the light in a plane which is at an angle between zero and two degrees with respect to the plane perpendicular to the longitudinal axis of the pipe section. The waveguide may be terminated at one end. A further waveguide may be disposed near the other end of the pipe section and may be in optical communication with the optical fibre. The pipe section may comprise a thread or a stab-in connection for connecting the pipe section to a further pipe section.

The pipe section may comprise a mechanical guiding means for aligning the waveguide with respect to a further waveguide of a further pipe section during attachment of the two pipe section to each other. The pipe section may further comprise an actuator for moving the waveguide with respect to the end of the pipe section for aligning the waveguide with respect to a further waveguide of a further pipe section. The pipe section may further comprise means for removing deposits from the waveguide surface.

The waveguide may be arranged to be optically coupled to a waveguide in a further pipe section when the pipe section is part of said elongate tubular and the optical coupling may be evanescent-wave coupling. The waveguide may be a polished half-block coupler. The pipe section may comprise a plurality of waveguides for providing a plurality of optical pathways. The pipe section may comprise a relay node for regenerating an optical signal.

According to a second aspect of the invention, there is provide a method of providing an optical communication path along a pipe section for coupling to one or more further pipe sections in order to form an elongate tubular, the method comprising: providing at least one optical fibre extending along the longitudinal direction of the section; providing a waveguide near one end of the pipe section, the waveguide being in optical communication with the optical fibre, the waveguide being configured to guide light in a plane substantially perpendicular to the longitudinal axis of the pipe section.

According to a third aspect of the invention, there is provide a method of operating an elongate tubular comprising an optical communication path provided along the elongate tubular, wherein the elongate tubular comprises a plurality of pipe sections, each one of the plurality of pipe sections comprising: an optical fibre extending along the longitudinal direction of the pipe section; a waveguide disposed near one end of the pipe section and being in optical communication with the optical fibre, the waveguide being configured to guide light in a plane substantially perpendicular to the longitudinal axis of the pipe section, and wherein the waveguide of one pipe section is optically coupled to the waveguide of an adjacent pipe section to provide the optical communication path, the method comprising transmitting optical signals along the optical communication path.

According to a fourth aspect of the invention, there is provide a method of installing an elongate tubular comprising an optical communication path provided along the elongate tubular, wherein the elongate tubular comprises a plurality of pipe sections, each one of the plurality of pipe sections comprising: an optical fibre extending along the longitudinal direction of the pipe section; a waveguide disposed near one end of the pipe section and being in optical communication with the optical fibre, the waveguide being configured to guide light in a plane substantially perpendicular to the longitudinal axis of the pipe section; the method comprising aligning the waveguide of one pipe section with the waveguide of an adjacent pipe section for providing an optical coupling between the waveguides.

The methods of the second, third and fourth aspect of the invention are compatible with the pipe section of the first aspect of the invention.

BRIEF DESCRIPTION OF DRAWINGS

Some embodiments of the invention will now be described by way of example only and with reference to the accompanying drawings, in which.

DETAILED DESCRIPTION

Figure 1:
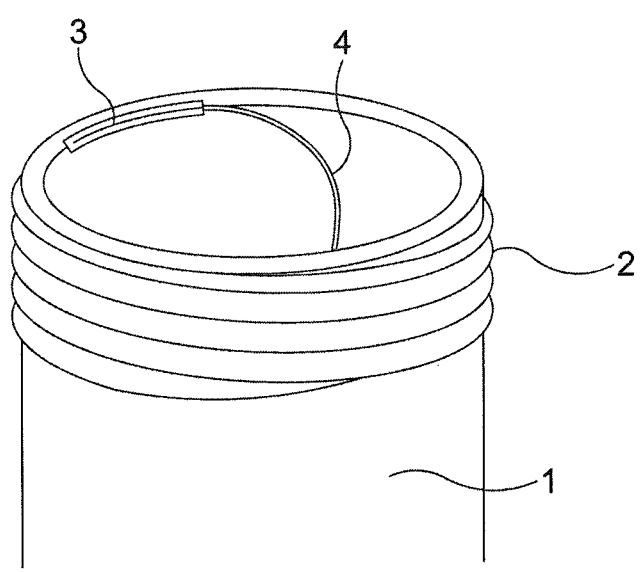
FIG. 1 illustrates schematically a pipe section with a waveguide

Herein disclosed is a pipe section for coupling to one or more further pipe sections in order to form an elongate tubular. The pipe section comprises an optical fibre extending along the longitudinal direction of the section. The optical fibre is arranged to carry an optical signal. The optical fibre is in optical communication with a waveguide disposed near one end of the pipe section. The waveguide is configured to guide light in a plane substantially perpendicular to the longitudinal axis of the pipe section. When two pipe sections are connected together, for example by way of a threaded connection, the waveguide of the first pipe section is arranged to be in the vicinity of the waveguide of the second pipe section such that the two waveguides are optically coupled by way of evanescent wave coupling.

In general, the transverse spatial profile of a mode of a waveguide partially extends outside a waveguide. When two waveguides are closely spaced together, the modes will partially overlap. The overlap between the modes can be considered as a first order perturbation to the eigenmodes of the individual waveguides, which leads to a coupling of the modes. The total area of overlap between the modes determines the efficiency of the coupling together with the length of the waveguide along which the modes are coupled and the matching of phase velocities.

The waveguide may be at least partially curved, following the wall of the pipe in the plane perpendicular to the longitudinal axis of the pipe. When fitting the two pipe sections together by way of a threaded connection, the two curved waveguides are arranged to have a region of overlap in which the waveguides are optically coupled. The two waveguides are arranged to provide an optical coupling when the two waveguides are adjacent along their entire length, and also when the two waveguides are adjacent for only part of the length of the waveguides. This tolerance in alignment of the waveguides enables an optical connection between two pipe sections which are connected by way of a threaded connection. The relative orientation of the two pipe sections connected together by the threaded connection depends on how tightly the two sections are connected and is not as reproducible as for some other types of connections such as a stab-in connection or a bayonet-type fitting. The optical coupling allows for some tolerance in the circular alignment of the waveguides.

The pipe section may include an actuator such as a piezoelectric element between the pipe and the waveguide for adjusting the position of the waveguide with respect to the pipe. The actuator enables optimisation of the optical coupling between two adjacent waveguides. The optimisation may be controlled by an operator or may be automated.

The pipe section may include a means for mechanically guiding the waveguide into alignment with the waveguide of a further pipe section. The guiding means may be attached to the main pipe section by a flexible connection to further improve the alignment. The waveguide may be placed in the plane perpendicular to the longitudinal axis of the pipe, or may be placed at a small angle to the plane perpendicular to the longitudinal axis of the pipe. A small angle of the waveguide in combination with some flexibility of the attachment to the main portion of the pipe may improve the alignment when compared to a waveguide which is in the plane perpendicular to the longitudinal axis of the pipe because the angle causes a small force in the direction perpendicular to the longitudinal axis of the pipe which force urges the two waveguides into closer alignment.

The waveguide is connected to an optical fibre at one end and is terminated at the other end. The waveguide may be terminated in a glass block, for example. The length of the coupling region between two waveguides determines the coupling efficiency and is chosen to optimise the coupling. If two long waveguides are used around the perimeter of the two pipe sections, the chance of creating an area of efficient coupling between the waveguides when connecting the pipe section together will be larger than if two short waveguides (with an end butt coupling) are used. However, if the area of overlap between the modes of the waveguides is too long, the light travelling through the waveguides will start to oscillate between the two waveguides and it will become difficult to transmit a signal from the fibre of the first pipe section to the fibre of the second pipe section. Therefore, a trade-off exists between optimising the chance of a good coupling by increasing the length of the two waveguides and optimising the efficiency of the coupling by limiting the length of the two waveguides.

Multiple waveguides may be used on either side of the connection between the pipe sections for increasing the chance of a pair of waveguides on either side of the pipe coupling being well aligned and thereby having a good coupling efficiency. However, multiple waveguides will lead to a significant increase in the optical losses of the system and it would not be possible to recover such losses. Multiple waveguides may be provided in a series of waveguides which are connected by optical fibres, or may be connected by a parallel set of waveguides, providing alternative tracks for the light to travel through.

A plurality of waveguides may be used, whereby each waveguide is coupled to a separate fibre. The plurality of waveguides and fibres provides a choice of the best optical coupling after the two pipe sections have been connected. The remaining waveguides and fibres may not be used after the best optical coupling has been selected. This redundancy provides more tolerance in the orientation of the connection between pipe sections. The different sets of fibres and waveguides may also be optimised for different operating conditions, such as pressure and temperature. Selection of the best coupling after the pipe sections have been connected does not require specific knowledge of the particular operating conditions at the location of the optical coupling, but only requires a selection of the optimal optical path. One or more relay nodes may be included along the length of the tubular for regenerating an optical signal.

The wavelength of the light is also a degree of freedom that can be used for optimizing a single optical coupling. The efficiency of the coupling is wavelength dependent and the wavelength can be tuned to optimise the coupling. The wavelength may also be tuned to compensate for changing operating conditions such as a change in temperature of the pipe.

The coupling efficiency may be increased by expanding the mode of the waveguide. The area of overlap of the modes of the two waveguides will increase and the change of correctly aligning the waveguides when connecting the pipe sections together will also increase. However, a substantial expansion of the mode of the waveguide will also lead to an increase of the loss of the waveguide, particularly at any bent sections, thereby limiting the desired amount of expansion.

The optical fibres together with the waveguide couplers provide a bidirectional path all the way through the pipe string from the bottom of a well to the surface and in the opposite direction from surface to the bottom of the well.

Some means of cleaning of the exposed portion of the waveguide may be provided for cleaning off any deposits before connecting the waveguide to a further waveguide, for example by way of a wiping system. The optical connection may permit a pure optical transmission such that use of light amplifiers can be omitted. The optical fibre transmission system can be operated effectively as single fibre where known tools of light shaping, pulse lengths, phase angle and multiple frequency technologies can be used to optimise the transmission system. A transmission protocol that is robust for reflections is preferably used, particularly if a single fibre is used for transmission and reception.

Sensors could be impinged on the fibre itself or coupled to the fibre in the pipe to provide a wide range of data collection options. The bidirectional data transmission speed can be increased from typically 56 Kbits per second in electric wired pipe to several Mbits per second, depending on the efficiency of the optical connection. The fiber itself can provide several Gbits per second transmission speed, but the total system would be limited by the efficiency of the connector. A data transmission rate in the Mbits per second area would open the possibility to provide all imaginable down hole sensor data at the surface in real time. This would provide the foundation to real active remote control of the drilling process or any other down hole well process.

By way of example, a pipe with a diameter of 10 cm is used during drilling or production. A waveguide with a length of 2 to 4 cm is arranged around the perimeter of the pipe in the plane perpendicular to the longitudinal axis of the pipe. The waveguide has a width of 5 to 20 μm in the radial direction of the pipe and a width of 3 to 10 μm in the longitudinal direction of the pipe. A wide waveguide provides better tolerance for radial alignment when compared to a narrow waveguide, but increases bend losses due to the diameter of the pipe. The spacing between the waveguide and a further waveguide on a further pipe section is on the order of 1 μm and is controlled with a precision well below 1 μm. The overlap between the two waveguides along the length of the waveguides may be off by 1 mm over total the length of the waveguides.

The phase velocity in the two waveguides needs to be matched for optical power to be transferred from the first waveguide to the second waveguide, effectively creating constructive interference. All optical power also needs to be in the mode that can be coupled to the adjacent waveguide and the waveguides need to be single mode devices. The power transfer is proportional to $\sin^2(aL)$, whereby the constant a for planar devices is roughly between 0.1 and 1 $mm^{-1}$ and wherein L is the length of the region of overlap between the waveguides. The value of the constant a decreases exponentially with the distance between the two waveguides. The length needs to be controlled such that the product aL is equal to $\pi/2$, or $3\pi/2$, etc. The variation of the product aL between a plurality of couplings needs to be well below 0.1 when a large number of optical couplers, such as 300, is used along a tubular. The diameter of the pipe limits the lowest index step possible to not much smaller than in an optical fiber, which in turn limits radial width of waveguide to a width on the order of 20 μm. A curvature leads to a radial change in phase velocity across the optical mode. If the radial change in phase velocity becomes large compared to the confining index change the mode will leak optical power. Therefore, a tight bend leads to a larger index step, which in turn leads to a smaller mode diameter for single mode operation.

Scattering and absorption of the light at the interface between the two waveguides leads to losses and therefore needs to be minimised. The length L can be altered by terminating the waveguide. The length L is a parameter which directly affects the coupling efficiency and which depends on the relative alignment of the two adjacent waveguides and the individual lengths of the two waveguides. One of the two waveguides may have a shorter length than the other waveguide.

By way of example, the waveguide may be a fibre block coupler such as a polished half block coupler. A polished half block coupler is manufactured by placing an optical fibre in a groove formed in a solid material such as metal and polishing away a top layer such that the fibre's cladding is removed and the core is exposed.

An expanded beam may be used in the waveguide (by means of tapering) or to couple the fibre to the waveguide by an external mode shaping component. An expanded beam will be less sensitive to radial imperfections that will occur in a drill pipe due to pressure variations.

FIG. 1 illustrates a pipe 1. A thread 2 is provided at the outside surface of the pipe at a region of the pipe terminating at the end of the pipe. A waveguide 3 is provided at the end region of the pipe and the waveguide 3 is optically connected to a fibre 4.

Figure 2:
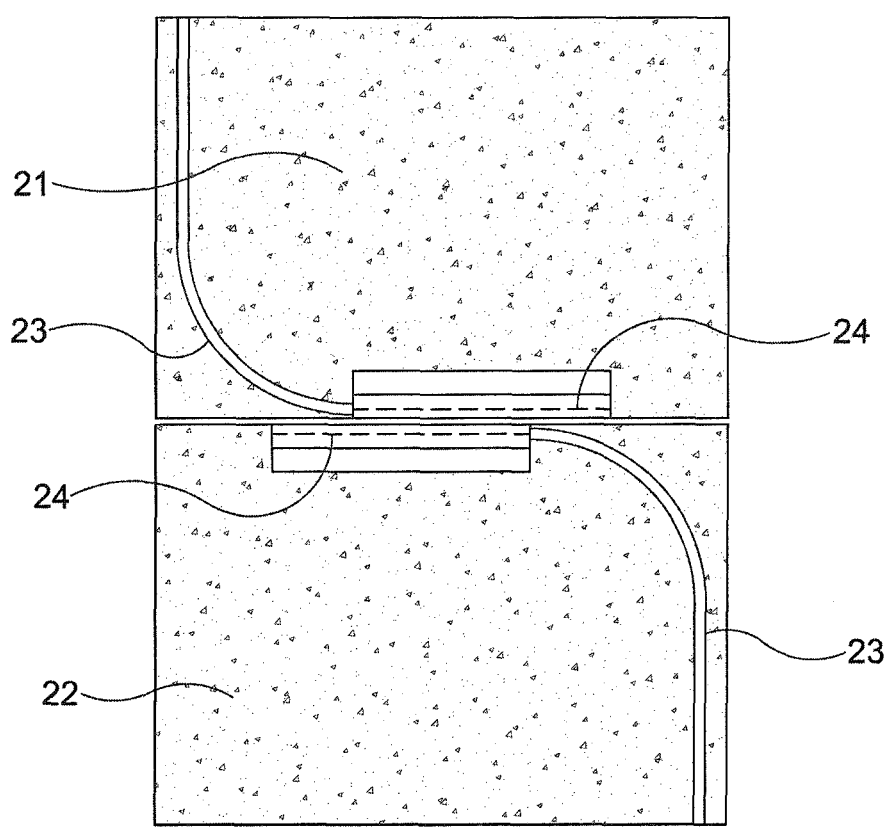
FIG. 2 illustrates schematically a cross section of two adjacent waveguides

FIG. 2 illustrates a cross section of an upper pipe section 21 and a lower pipe section 22. The upper and lower pipe sections each have a fibre 23 provided along their length. Each fibre is optically connected to a waveguide 24 provided at the end of the pipe sections. The first waveguide is in the vicinity of the second waveguide for part of its length such that evanescent coupling between the modes of the two waveguides can take place.

A protection to the waveguide can be provided by two sealing barriers. One of the barriers can be the treads of the pipe connection and the other can be formed by a gasket such as an O-ring. Alternatively, the waveguide can be provided in between two O-rings. The waveguide can be provided inside the threads as illustrated in FIG. 1, or outside the threads at an exterior of the pipe. A location of the waveguide more remote from the centre of the pipe may be beneficial because that allows for a larger radius of curvature.

Although the invention has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein.

The invention claimed is:

1. A pipe section for coupling to one or more further pipe sections in order to form an elongate tubular, the pipe section comprising:
    an optical fiber extending along the longitudinal direction of the pipe section; and
    a waveguide disposed near one end of the pipe section and being in optical communication with the optical fiber, the waveguide being configured to guide light in a plane substantially perpendicular to the longitudinal axis of the pipe section,
    wherein the waveguide is arranged to be optically coupled to a waveguide in a further pipe section when the pipe section is part of said elongate tubular, and
    wherein said optical coupling is an evanescent-wave coupling.

2. The pipe section of claim 1, wherein the waveguide is at least partially curved.

3. The pipe section of claim 2, wherein the waveguide has a radius of curvature substantially the same as the radius of curvature of a wall of the pipe section.

4. The pipe section of claim 1, wherein the waveguide has at least one mode which partially extends outside the waveguide.

5. The pipe section of claim 4, wherein the mode extends into a region outside the pipe section.

6. The pipe section of claim 1, wherein the waveguide is configured to guide the light in a plane which is at an angle between zero and five degrees with respect to the plane perpendicular to the longitudinal axis of the pipe section.

7. The pipe section of claim 1, wherein the waveguide is terminated at one end.

8. The pipe section of claim 1, comprising a further waveguide disposed near the other end of the pipe section and being in optical communication with the optical fiber.

9. The pipe section of claim 1, comprising a thread for connecting the pipe section to a further pipe section.

10. The pipe section of claim 1, comprising a stab-in connection for connecting the pipe section to a further pipe section.

11. The pipe section of claim 1, comprising a piezoelectric element between the pipe and the waveguide for moving the waveguide with respect to the end of the pipe section for aligning the waveguide with respect to a further waveguide of a further pipe section.

12. The pipe section of claim 1, further comprising a wiping system for removing deposits from the waveguide surface.

13. The pipe section of claim 1, wherein the waveguide is a polished half-block coupler.

14. The pipe section of claim 1, comprising a plurality of waveguides for providing a plurality of optical pathways.

15. The pipe section of claim 1, further comprising a relay node for regenerating an optical signal.

16. A method of providing an optical communication path along a pipe section for coupling to one or more further pipe sections in order to form an elongate tubular, the method comprising:
providing at least one optical fiber extending along the longitudinal direction of the section;
providing a waveguide near one end of the pipe section, the waveguide being in optical communication with the optical fiber, the waveguide being configured to guide light in a plane substantially perpendicular to the longitudinal axis of the pipe section; and
arranging the waveguide to be optically coupled to a second waveguide in a further pipe section when the pipe section is part of said elongate tubular,
wherein said optical coupling is an evanescent-wave coupling.

17. A method of operating an elongate tubular comprising an optical communication path provided along the elongate tubular, wherein the elongate tubular comprises a plurality of pipe sections, each one of the plurality of pipe sections comprising:
an optical fiber extending along the longitudinal direction of the pipe section; and
a waveguide disposed near one end of the pipe section and being in optical communication with the optical fiber, the waveguide being configured to guide light in a plane substantially perpendicular to the longitudinal axis of the pipe section, wherein the waveguide of one pipe section is optically coupled to the waveguide of an adjacent pipe section to provide the optical communication path, and wherein said optical coupling is an evanescent-wave coupling,
the method comprising transmitting optical signals along the optical communication path.

18. A method of installing an elongate tubular comprising an optical communication path provided along the elongate tubular, wherein the elongate tubular comprises a plurality of pipe sections, each one of the plurality of pipe sections comprising:
an optical fiber extending along the longitudinal direction of the pipe section; and
a waveguide disposed near one end of the pipe section and being in optical communication with the optical fiber, the waveguide being configured to guide light in a plane substantially perpendicular to the longitudinal axis of the pipe section,
the method comprising aligning the waveguide of one pipe section with the waveguide of an adjacent pipe section for providing an optical coupling between the waveguides, wherein said optical coupling is an evanescent-wave coupling.

* * * * *